June 30, 1964  R. W. FLEWELLING  3,138,879
CALCULATING DEVICE

Filed June 19, 1961  2 Sheets-Sheet 1

INVENTOR.
Robert W. Flewelling
BY
Townsend and Townsend
attorneys

June 30, 1964  R. W. FLEWELLING  3,138,879
CALCULATING DEVICE

Filed June 19, 1961  2 Sheets-Sheet 2

INVENTOR.
Robert W. Flewelling
BY
Townsend and Townsend
attorneys

United States Patent Office 3,138,879
Patented June 30, 1964

3,138,879
CALCULATING DEVICE
Robert Wealthy Flewelling, 1336 Alta Way,
Hanford, Calif.
Filed June 19, 1961, Ser. No. 129,926
2 Claims. (Cl. 35—32)

This invention relates to counting devices and more particularly relates to a new and useful apparatus for performing and demonstrating performance of the various basic and other mathematical calculations.

Heretofore it usually has been the practice when teaching mathematics to beginning students (and particularly basic arithmetic) that only problems in base 10 or the decimal number system were taught.

With the advent of electronic and other types of computers, a knowledge of other number systems, and particularly the binary or base 2 system, has become more and more important in the study of mathematics. However, because beginning students are familiarized and acquainted only with the decimal system, a rather strong base 10 prejudice develops and substantial thought reorientation is required before even simple principles in other number bases can be understood and appreciated.

Another primary problem inherent in the present system of teaching basic mathematics is that the young student is familiarized with symbols and signs for numerical quantities and, with these symbols as a foundation, problems are solved with reference to various number combinations committed to memory. Such a method, in that it oftentimes fails to present the student with a sound understanding of the functions and operations performed, tends to build up a distaste for arithmetic and later mathematics not found in other courses of study.

Many and various devices have been provided to overcome this latter problem, but those with which I am familiar rely chiefly upon the sense of hearing through oral instruction and the sense of sight by presentation of workbooks and the like pictorially illustrating objects familiar to the child in different quantities which are then equated and identified with their equivalent numerical symbols and signs. While some students are able to make the transition from pictures of objects to number symbols with relative ease, for many it requires a substantial period of time. Still others, lacking the basic understanding, never do make the transition with any degree of success.

It is a primary object of the present invention to provide an apparatus for teaching mathematics, and particularly basic arithmetic, to beginning students which permits calculations in diverse bases such as base 10, base 2 and base 5, and which readily demonstrates the identity of arithmetical functions in different number systems and their relationships, thereby avoiding the development of a base 10 bias.

It is another primary object of the present invention to provide an apparatus for teaching basic arithmetic to children at the grammar school level which eliminates reference to numerical symbols and signs and which calls into play the sense of touch as well as sight by requiring a physical manipulation of units in the calculating process.

To accomplish the above objects the present invention comprises a counting apparatus which includes a sheet of material having a frame which extends about the periphery and above the face of the sheet. The frame includes first and second vertical portions and an upper and a horizontal lower frame portion. Within the frame are a series of spaced apart strips mounted on the upper face of the sheet by adhesive or other suitable means or grooves cut into the upper face so that a series of spaced apart vertical columns are defined between the strips and the first and second vertical frame portions.

This device is used in combination with a plurality of removable blocks which function as counting units and which are maintainable in vertical alignment in the columns by the strips and frame. Preferably the blocks are equally dimensioned and to facilitate their manipulation in the columns, have a horizontal extension slightly less than the width of a column. A movable indicator such as a bar or rod, a piece of wire, masking tape or an equivalent thereof is provided to mark the upper limits of the different number of bases defined or contained by the counting apparatus.

Such an indicator is selectively mountable at a plurality of locations on or in the apparatus so as to span or bridge all of the vertical columns normal to the columns and parallel with the horizontal lower frame portion of the sheet. The vertical height of each column, as limited by the movable indictor, limits the number of places into which counting units can be inserted before another column must be used in the number; and each vertical column represents a different power of the base. Movement of the movable indicator from one elevation above the horizontal lower frame portion to another permits computations in a different number base. Thus, since computations in different number systems are identical, beginning students may be taught to do problems in addition, subtraction, multiplication and division in any number base simply by changing the location of the movable indicator. Additionally, since vertical and horizontal placing and counting of units in the device is all that is required in making computations, there is no need for reference to numerical signs and symbols.

A feature and advantage of the invention resides in the fact that by means of the vertical columns the student will quickly gain an appreciation for the significance of place value and of the concept of zero as will be more fully explained hereinafter.

Another primary object of the within invention is to provide apparatus of the type described which will dramatically illustrate to the beginning student the concept of carrying and borrowing. Thus, the marker or indicator which horizontally spans the vertical place columns prohibits placement of cubes in the spaces beyond the vertical limits of the particular number system chosen for use. When this upper limit is reached the marker indicates that a carrying or borrowing step is required.

Still another object of the within invention is to eliminate the tendency of the student to develop what may be termed a base 10 bias or prejudice concerning measurements. Such a tendency in some instances is for the student to shrink his concept of a foot to a 10" measurement. This tendency is avoided by providing a frame of the type described which is 12" by 12" in dimension for use with blocks which each comprise one cubic inch. Thus, direct experience in manipulating units in our measurement system may be had while the student is working with problems in the decimal system.

It is a further object and advantage of the present invention to provide a simple and study device of the type described which will withstand hard and long use and yet which may be conveniently packaged, shipped and stored.

Other objects of the invention will become apparent upon reading the following specification and referring to the accompanying drawings in which similar characters of reference represent corresponding parts in each of the several views.

Figure 1:
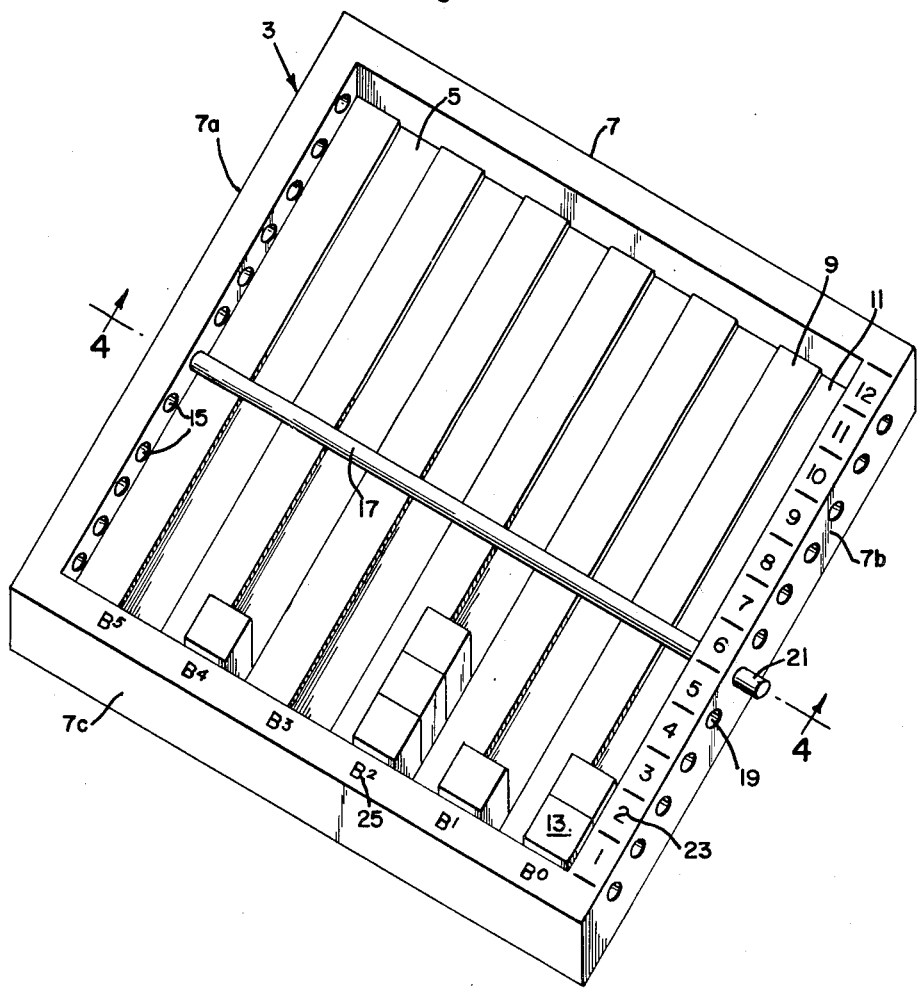
FIG. 1 is a perspective view of a first embodiment of the invention.

Turning now more particularly to the drawings, FIG. 1 shows a container generally indicated at 3 comprising a rectangular sheet of material 5 and a frame 7 disposed about the periphery of the sheet. The container may be fabricated from any suitable materials such as wood or plastic and includes a series of strips or separators 9 which are parallel with each other and the vertical frame portions 7a and 7b so that a plurality of grooves or columns 11 are defined therebetween. Preferably there are six columns and six strips, each having a width approximately equal to 1″ and the vertical heighth of the strips and columns is 12″, making the internal dimensions of the container 1 sq. ft. The counting units or blocks 13 are shown reposed in some of the channels and each block is 1 cubic inch. By so dimensioning the apparatus, the student may be required to perform base 10 calculations with units in our measurement system such as the inch and the foot. Thus, the tendency of some to shrink the concept of a foot to 10″ is avoided.

The frame portion 7a is shown formed with a number of spaced apart sockets 15 for receiving one end of horizontal bar 17, and frame portion 7b has a plurality of spaced apart apertures formed therethrough as at 19 to receive the other end of bar 17. As is seen from the drawings, the bar receiving portions 15 and 19 of the frame are in alignment and will retain the bar 17 in a position parallel to the lower horizontal frame portion 7c.

The bar 17 may easily be removed from the frame by pulling bar end 21 extending outwardly from frame portion 7b, whereupon the bar may be relocated or remounted at whatever level is desired.

On the upper face of the vertical frame portion suitable indicia as at 23 may be included to provide ready reference to the number of blocks or cubes 13 placed vertically in channels 11. Also, the various columns may include indicia such as that shown at 25 to eliminate the necessity of column counting when dealing in numbers having many digits. Although numerals and letters are shown in the drawings, as is obvious, any type or kind of suitable indicia may be employed for reference purposes.

In the device of FIG. 1 each column or channel 11 indicates a different digit in a number and the heighth of each column, as limited by the position of bar 17, indicates the number of places in the column which can be used prior to the step of carrying or borrowing (as the case may be) to the next adjacent column.

Figure 2A:
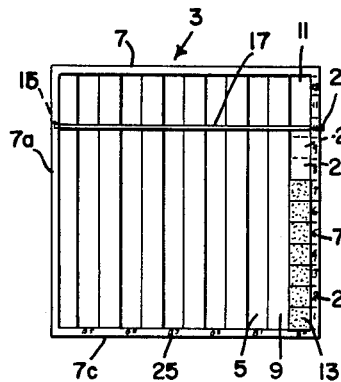
FIGS. 2A–2C are schematic views of the invention of FIG. 1 illustrating an addition problem in the base 10 or decimal number system.
Figure 2B:
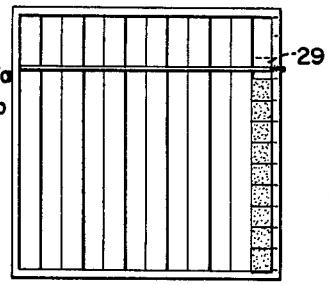
Figure 2C:
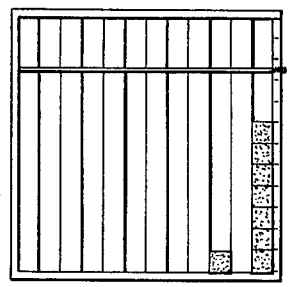

Turning now to FIGS. 2A–2C. A container such as that in FIG. 1 is shown schematically to demonstrate function of the device with reference to simple problems in addition. In FIG. 2A seven cubes have been placed in the units column. The bar 17 is located at the 10th vertical place. The two blocks shown in the dotted line positions at 27a and 27b are being added. After the insertion of these two blocks, the beginning student simply counts the number of blocks to arrive at the sum 9.

FIGS. 2B and 2C show the process employed in adding 8 to the sum of 9 shown in FIG. 2A. The student commences to add 8 blocks to the 9 already appearing in the units column. However, when the attempt is made to add the first block of the set of 8, it becomes apparent at once that carrying is required. This is because bar 17 which spans the column at the tenth place prevents insertion as illustrated by the block in the dotted line position at 29. The student then exchanges the 10 blocks in the units column for one block in the 10's column next adjacent and adds 7 blocks (the balance of the set of 8) to the units column. The sum as shown in FIG. 2C is 17.

FIGS. 3A–3D schematically illustrate a modification of the FIG. 1 apparatus. A strip of masking tape 31 is stretched across the vertical columns 11 and is shown mounted on the upper face of vertical frame portions 7a and 7b masking the 5th place of each of columns 11. The tape 31 has an adhesive backing so that it will removably adhere to the frame surface at various locations.

Figure 3A:
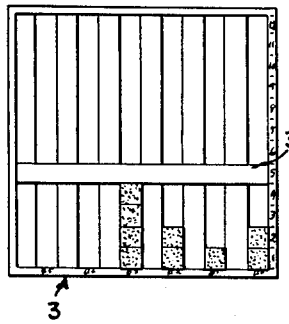
FIGS. 3A–3D are schematic views of a second embodiment of the invention demonstrating an addition problem in the quinary or base 5 number system.
Figure 3B:
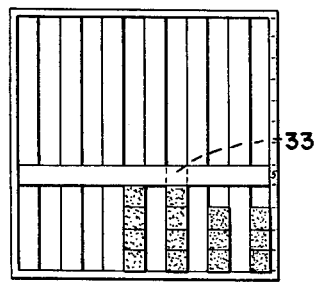
Figure 3C:
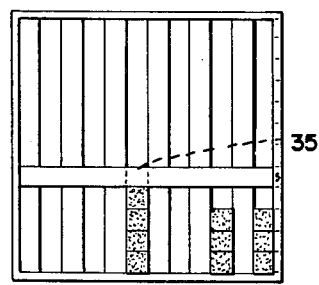
Figure 3D:
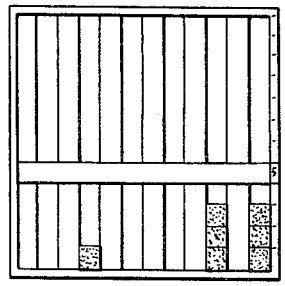
Figure 4:
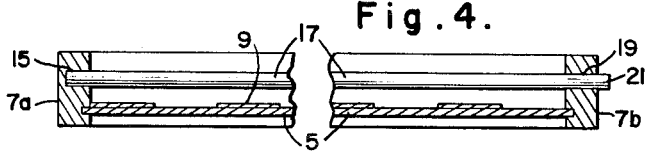
FIG. 4 is a fragmentary cross-sectional view of the embodiment of FIG. 1.
Figure 5:
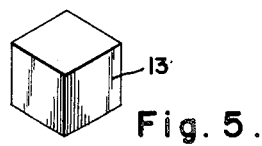
FIG. 5 is a perspective view of a counting unit for use with both embodiments of the invention.

In FIGS. 3A–3D a problem of addition in the quinary number system is demonstrated. FIG. 3A shows the number 4212 in the base 5 number system. If it is desired to add to this, base 5 number 321, one block is placed in the units column, two blocks are placed in the 10's column and an attempt made to insert three blocks in the 100's column. However, the 100's column cannot receive three additional blocks because the 5th place, as indicated by the broken lines at 33, will rest on the masking tape 31. Consequently, a carrying step is indicated and the five blocks in the 100's column are exchanged for one block in the 1,000's column. As indicated in FIG. 3C, the block in the dotted line position at 35 cannot be inserted in the 1,000's column and therefore another carrying step must be made. Again the five blocks of the 1,000's column are exchanged for one block which is inserted in the 10,000's column, thereby completing the addition process. The sum will be 10,033 in the quinary number system. Computation will be made in the identical manner when dealing with the binary number system (base 2) or any other number system embraced by the device, and by process well known in the art of mathematics, the sums can be checked for accuracy by conversion to the decimal system.

It will be noted that in the immediately foregoing example, after the calculation was completed the columns between the 10,000's column and the 10's column were left without blocks or counting units. This void or absence of blocks vividly conveys the concept of zero and permits a sound appreciation of the function of zero in the art of numbers.

While the above example problems were in addition, with like ease and facility computations on the apparatus can be in subtraction (a reverse process of addition), in multiplication (the addition of sets of numbers), and in division (the opposite of multiplication).

From the foregoing it is seen that the present invention provides a simple and sturdy device for performing and demonstrating various mathematical calculations in different number systems in a graphic and realistic manner by use of sight and touch without reference to or dependency on symbols and signs in a simple, realistic and interesting way which tends to eliminate various number prejudices oftentimes acquired by students beginning the study of mathematics.

Although the foregoing invention has been described in some detail by way of illustration and example for purposes of clarity of understanding, it is understood that certain changes and modifications may be practiced within the spirit of the invention and scope of the appended claims.

What is claimed is:

1. A counting device comprising in combination: a container including a sheet of material and a frame about the periphery thereof including first and second vertical portions and an upper and a horizontal lower frame portion, said frame extending above the plane of said sheet; a series of spaced apart strips mounted on said sheet defining a series of vertical columns between each other and said first and second vertical frame portions; counting units for said container comprising a plurality of blocks maintainable in vertical alignment in said columns by said strips and said frame, said blocks being equally dimensioned and having a horizontal extension slightly less than that of one of said columns; movable indicator means on said container for indicating the upper limits of different number bases in said counting device and selectively mountable at a plurality of locations across each of said columns parallel to said lower frame portion at vertically spaced apart distances equal to the vertical dimension of one of said blocks, said means masking an area in each of said columns equal to the area of one of said blocks.

2. In a counting device for teaching mathematics in various bases to an operator comprising in combination: a plurality of cubic blocks each of equal size; a container including a rectangular sheet of rigid material; a plurality of separator strips having a thickness less than the height of said blocks being secured to said rectangular sheet in parallel relationship and spaced apart at a distance of at least a block width to form a plurality of columnar grooves between said separator strips for receiving said blocks; a border strip mounted about at least the upper and lower peripheral edges of said rectangular sheet and at a right angle to said separator strips, said border strips having a height sufficient to define the ends of the columnar grooves; an apertured border member mounted to the peripheral side edges of said rectangular sheet in parallel relationship to said separator strips, said border member having a plurality of apertures formed therethrough, each aperture being spaced apart a distance equal to one block length and coaxially positioned to intersect the columnar grooves at only distances between integral block lengths; a bar member removably mountable in individual pairs of coaxially aligned apertures to obstruct the insertion of said blocks in the columnar grooves after a predetermined number of blocks have been inserted whereby the maximum number of blocks insertable in said column define the number base; and indicia means secured to one of said apertured border members to provide a visible indication of the number base in which the operator is working whereby the operator can remove and insert blocks from the columnar grooves with his fingertips to perform mathematical functions in various number bases as determined by the position of the base.

References Cited in the file of this patent

UNITED STATES PATENTS

| 971,185 | Freeman | Sept. 27, 1910 |
| 2,646,631 | Lazar | July 28, 1953 |

FOREIGN PATENTS

| 587,220 | Great Britain | Apr. 17, 1947 |